United States Patent
Jinno et al.

(10) Patent No.: US 8,255,137 B2
(45) Date of Patent: Aug. 28, 2012

(54) VEHICLE AND CONTROL METHOD THEREOF

(75) Inventors: Kunihiko Jinno, Toyota (JP); Tadashi Nakagawa, Aichi-ken (JP); Masahiko Maeda, Nagoya (JP); Hideaki Yaguchi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 470 days.

(21) Appl. No.: 12/519,307

(22) PCT Filed: Oct. 25, 2007

(86) PCT No.: PCT/JP2007/070819
§ 371 (c)(1),
(2), (4) Date: Jun. 15, 2009

(87) PCT Pub. No.: WO2008/075502
PCT Pub. Date: Jun. 26, 2008

(65) Prior Publication Data
US 2010/0076657 A1  Mar. 25, 2010

(30) Foreign Application Priority Data
Dec. 19, 2006  (JP) .................. 2006-341200

(51) Int. Cl.
G06F 7/70   (2006.01)
G06F 19/00  (2006.01)
G06G 7/00   (2006.01)
G06G 7/76   (2006.01)

(52) U.S. Cl. ............ 701/70; 701/78; 701/79; 701/83; 303/152; 303/166; 303/167; 180/65.31; 903/947

(58) Field of Classification Search .............. 701/70, 701/78, 79, 83; 303/3, 15, 152, 166, 167; 180/65.22, 65.265, 65.275, 65.31; 903/947
See application file for complete search history.

(56) References Cited

U.S. PATENT DOCUMENTS

| | | | |
|---|---|---|---|
| 5,895,100 A * | 4/1999 | Ito et al. ................ | 303/152 |
| 6,454,364 B1 * | 9/2002 | Niwa et al. ............. | 303/152 |
| 6,910,747 B2 | 6/2005 | Tsunehara | |
| 7,503,631 B2 * | 3/2009 | Tezuka .................. | 303/152 |
| 7,878,605 B2 * | 2/2011 | Kokubo et al. ......... | 303/151 |
| 2004/0108771 A1 * | 6/2004 | Tsunehara .............. | 303/155 |
| 2007/0193808 A1 * | 8/2007 | Perakes et al. ......... | 180/242 |
| 2007/0241611 A1 * | 10/2007 | Shimada et al. ........ | 303/152 |

FOREIGN PATENT DOCUMENTS
DE   197 03 061 A1   7/1997
(Continued)

OTHER PUBLICATIONS

German Office Action for corresponding German Patent Application No. 11 2007 003 093.3-32.

*Primary Examiner* — Thomas Tarcza
*Assistant Examiner* — Rami Khatib
(74) *Attorney, Agent, or Firm* — Sughrue Mion, PLLC

(57) ABSTRACT

In a hybrid vehicle 20, when an ECO switch 88 is "on" when a brake demand operation is performed by a driver, a target regeneration distribution rate d is set using an ECO mode regeneration distribution rate setting map that gives priority to energy efficiency in comparison to a normal regeneration distribution rate setting map that is used when the ECO switch 88 is "off" and a braking force demand BF* that is based on the brake demand operation of the driver (S150), and a motor MG2 and a brake unit 90 are controlled so that the braking force demand BF* is obtained based on the target regeneration distribution rate d (S160 to S230).

7 Claims, 6 Drawing Sheets

FOREIGN PATENT DOCUMENTS

| | | |
|---|---|---|
| JP | 2004-189056 A | 7/2004 |
| JP | 2004-196064 A | 7/2004 |
| JP | 2005-028934 A | 2/2005 |
| JP | 2005-329926 A | 12/2005 |
| JP | 2006-151039 A | 6/2006 |
| JP | 2006-205787 A | 8/2006 |

* cited by examiner

VEHICLE AND CONTROL METHOD THEREOF

TECHNICAL FIELD

The present invention relates to a vehicle and control method thereof, especially relates to a vehicle having a motor capable of outputting a regenerative braking force and a frictional braking unit capable of outputting a frictional braking force, and control method thereof.

BACKGROUND ART

An apparatus that decreases a share rate of regenerative braking accompanying a decrease in a vehicle speed and increases a share rate of frictional braking by the amount of decrease in the regenerative braking is already known as a vehicle control apparatus that coordinates regenerative braking and frictional braking to obtain a braking force (for example, see Patent Document 1). According to the aforementioned vehicle control apparatus, when switching from regenerative braking to frictional braking, to prevent insufficient deceleration due to a response delay with respect to a command value of the frictional braking, the rate of decrease in the regenerative braking torque is controlled in accordance with a response delay of the frictional braking torque.
[Patent Document 1] Japanese Patent Laid-Open No. 2004-196064

DISCLOSURE OF THE INVENTION

In a vehicle equipped with the above described vehicle control apparatus, when a brake demand operation is performed by a driver, braking control is set so that the lower the vehicle speed is, the greater the share rate of frictional braking compared to that of regenerative braking, and hence, although drivability such as braking performance and braking feeling can be secured, there are cases in which energy efficiency such as fuel consumption of the vehicle deteriorates by a corresponding amount. Further, it is considered that there are some drivers who desire an increase in energy efficiency even if it means that the level of drivability is diminished to some degree within a range that does not hinder driving.

In view of this, an object of the present invention is to allow drivers and others to arbitrarily select whether or not to give priority to improving the energy efficiency of the vehicle having a motor capable of outputting a regenerative braking force and a frictional braking unit capable of outputting a frictional braking force.

In order to achieve the above object, the vehicle and control method thereof in accordance with the present invention adopt the following means.

The present invention is directed to a vehicle having a motor capable of outputting a regenerative braking force and a frictional braking unit capable of outputting a frictional braking force. The vehicle includes: a braking force demand setting module that sets a braking force demand that is demanded by a brake demand operation of a driver; an efficiency priority mode selection switch for selecting an efficiency priority mode that gives priority to energy efficiency; a braking force distribution ratio setting module that sets a distribution ratio between the regenerative braking force and the frictional braking force based on the set braking force demand and a first braking force distribution restriction that defines a relationship between a vehicle speed and the distribution ratio between the regenerative braking force and the frictional braking force with respect to the braking force demand when the efficiency priority mode selection switch is turned off upon the brake demand operation, the braking force distribution ratio setting module setting the distribution ratio between the regenerative braking force and the frictional braking force based on the set braking force demand and a second braking force distribution restriction that gives priority to energy efficiency in comparison to the first braking force distribution restriction to define a relationship between the vehicle speed and the distribution ratio with respect to the braking force demand when the efficiency priority mode selection switch is turned on upon the brake demand operation; and a brake control module that controls the motor and the frictional braking unit so that the braking force demand is ensured based on the set distribution ratio.

According to this vehicle, in a case in which the efficiency priority mode selection switch is "off" when the driver performs a brake demand operation, the distribution ratio between the regenerative braking force and the frictional braking force is set using the braking force demand based on the brake demand operation and the first braking force distribution restriction, and the motor and the frictional braking unit are controlled such that the braking force demand is obtained based on the distribution ratio that is set. Further, in a case in which the efficiency priority mode selection switch is "on" when a brake demand operation is performed, the distribution ratio between the regenerative braking force and the frictional braking force is set using the braking force demand based on the brake demand operation and the second braking force distribution restriction that gives priority to energy efficiency in comparison to the first braking force distribution restriction, and the motor and the frictional braking unit are controlled such that the braking force demand is obtained based on the distribution ratio that is set. Thus, according to this vehicle, by merely operating the efficiency priority mode selection switch it is possible to arbitrarily select whether or not to give priority to improving the energy efficiency of the vehicle. More specifically, by switching off the efficiency priority mode selection switch it is possible to favorably ensure drivability including braking performance and braking feeling when a brake demand operation is executed, even though the energy efficiency of the vehicle is lost to some degree. In contrast, by switching on the efficiency priority mode selection switch it is possible to improve the energy efficiency when a brake demand operation is executed, even though the level of drivability is diminished to some degree within a range that does not hinder driving.

Moreover, the vehicle described above may further include a vehicle speed detection unit that detects the vehicle speed. And the second braking force distribution restriction may increases a distribution amount of the regenerative braking force in comparison to the first braking force distribution restriction when the detected speed is in a predetermined vehicle speed region. Thus, when the efficiency priority mode selection switch is "on", energy recovery by the motor is promoted and the energy efficiency of the vehicle can be improved.

Further, the second braking force distribution restriction may decrease a lower limit of a regeneration execution vehicle speed that is a vehicle speed when the motor is caused to output the regenerative braking force in comparison to the first braking force distribution restriction. It is therefore possible to further improve the energy efficiency of the vehicle by executing energy recovery by the motor as much as possible even in a low vehicle speed region.

Moreover, the vehicle described above may further include: an internal combustion engine; a power transmitting mechanism that has an axle-side rotational element connected to a predetermined axle and an engine-side rotational element connected to an engine shaft of the internal combustion engine and configured to differentially rotate with respect to the axle-side rotational element, the power transmitting mechanism capable of outputting at least a part of power from the engine shaft to the axle side; and an accumulator capable of supplying and receiving electric power from the motor. And the motor may be capable of inputting and outputting power to the predetermined axle or another axle different from the predetermined axle.

Further, the power transmitting mechanism may be an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator. In this case, the electric power-mechanical power input output mechanism may include a motor for power generation capable of inputting and outputting power, and a three shaft-type power input output assembly connected with three shafts, the predetermined axle, the engine shaft of the internal combustion engine, and a rotating shaft of the motor for power generation, the three shaft-type power input output assembly configured to input and output power to one remaining shaft, based on input and output of powers from and to any two shafts selected among the three shafts, and wherein the motor is capable of outputting power to the predetermined axle or another axle different from the predetermined axle.

Moreover, the power transmitting mechanism may be a continuously variable transmission.

In addition, the motor may be capable of inputting and outputting a power to a predetermined axle.

The present invention is directed to a control method of a vehicle including a motor capable of outputting a regenerative braking force, a frictional braking unit capable of outputting a frictional braking force, and an efficiency priority mode selection switch for selecting an efficiency priority mode that gives priority to energy efficiency. The control method includes the steps of: (a) setting a distribution ratio between the regenerative braking force and the frictional braking force based on a braking force demand and a first braking force distribution restriction that defines a relationship between a vehicle speed and the distribution ratio between the regenerative braking force and the frictional braking force with respect to the braking force demand when the efficiency priority mode selection switch is turned off upon the brake demand operation, the step (a) setting the distribution ratio between the regenerative braking force and the frictional braking force based on the set braking force demand and a second braking force distribution restriction that gives priority to energy efficiency in comparison to the first braking force distribution restriction to define a relationship between the vehicle speed and the distribution ratio with respect to the braking force demand when the efficiency priority mode selection switch is turned on upon the brake demand operation; and (b) controlling the motor and the frictional braking unit so that the braking force demand is ensured based on the distribution ratio set at the step (a).

According to this method, by merely operating the efficiency priority mode selection switch it is possible to arbitrarily select whether or not to give priority to improving the energy efficiency of the vehicle. More specifically, by switching off the efficiency priority mode selection switch it is possible to favorably ensure drivability including braking performance and braking feeling, even though the energy efficiency of the vehicle is lost to some degree. In contrast, by switching on the efficiency priority mode selection switch it is possible to improve the energy efficiency, even though the level of drivability is diminished to some degree within a range that does not hinder driving.

Moreover, in the method described above, the second braking force distribution restriction may increases a distribution amount of the regenerative braking force in comparison to the first braking force distribution restriction when the vehicle speed of the vehicle is in a predetermined vehicle speed region. In this case, the second braking force distribution restriction may decrease a lower limit of a regeneration execution vehicle speed that is a vehicle speed when the motor is caused to output the regenerative braking force in comparison to the first braking force distribution restriction.

BEST MODE FOR CARRYING OUT THE INVENTION

Hereinafter, the best mode for carrying out the invention will be described with reference to embodiments.

Figure 1:
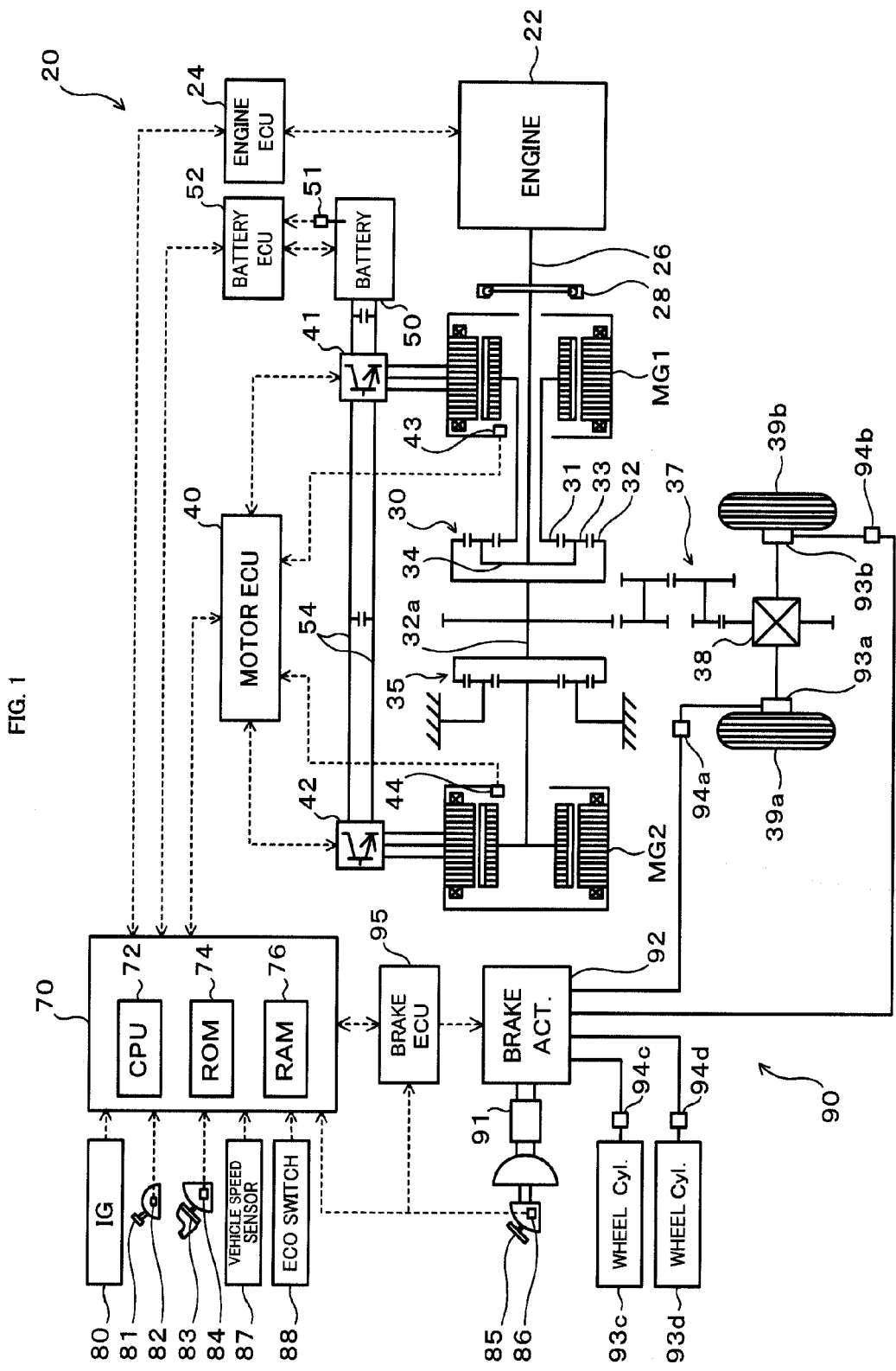
FIG. 1 is a schematic configuration view of a hybrid vehicle 20 according to an embodiment of the present invention.

FIG. 1 is a schematic configuration view of a hybrid vehicle 20 as a vehicle according to an embodiment of the present invention. The hybrid vehicle 20 shown in FIG. 1 includes an engine 22, a three shaft-type power distribution and integration mechanism 30 connected via a damper 28 to a crankshaft 26 which is an output shaft of the engine 22, a motor MG1 capable of generating electric power which is connected to the power distribution and integration mechanism 30, a reduction gear 35 that is mounted to a ring gear shaft 32a as an axle that is connected to the power distribution and integration mechanism 30, a motor MG2 mechanically connected to the ring gear shaft 32a via the reduction gear 35, an electronically-controlled hydraulic braking unit (hereunder, simply referred to as "brake unit") 90 that is a control module capable of outputting a frictional braking force, and a hybrid electronic control unit (hereunder, referred to as "hybrid ECU") 70 for controlling the entire hybrid vehicle 20, and the like.

The engine 22 is an internal combustion engine which outputs power by receiving a supply of a hydrocarbonaceous fuel such as gasoline and a diesel oil, and receives control of a fuel injection amount, an ignition timing, an intake air amount, and the like from an engine electronic control unit (hereinafter referred to as "engine ECU") 24. The engine ECU 24 receives signals from various kinds of sensors which are provided with respect to the engine 22 and detect an operating state of the engine 22. Moreover, the engine ECU 24 communicates with the hybrid ECU 70, controls the operation of the engine 22 based on control signals from the hybrid ECU 70 and signals from the above sensors, and outputs data about the operating state of the engine 22 to the hybrid ECU 70 as needed.

The power distribution and integration mechanism 30 includes a sun gear 31 which is an external gear; a ring gear 32 which is an internal gear arranged concentrically with the sun gear 31; a plurality of pinion gears 33 that are meshed with the sun gear 31 and are also meshed with the ring gear 32; and a carrier 34 which rotatably and spinably holds the plurality of pinion gears 33. The power distribution and integration mechanism 30 is constructed as a planetary gear mechanism that performs a differential action using the sun gear 31, the ring gear 32, and the carrier 34 as rotational elements. The power distribution and integration mechanism 30 is configured so that the crankshaft 26 of the engine 22 and the motor MG1 are coupled with the carrier 34 and the sun gear 31, respectively, as engine-side rotational elements, and the reduction gear 35 is coupled via the ring gear shaft 32a with ring gear 32 as an axle-side rotational element. When the motor MG1 functions as a generator, the power from the engine 22 which is input from the carrier 34 is distributed to the sun gear 31 side and the ring gear 32 side according to the gear ratio. When the motor MG1 functions as a motor, the power from the engine 22 which is input from the carrier 34, and the power from the motor MG1 which is input from the sun gear 31 are integrated and output to the ring gear 32 side. The power output to the ring gear 32 is ultimately output to wheels 39a and 39b serving as drive wheels via a gear mechanism 37 and a differential gear 38 from the ring gear shaft 32a.

Each of the motor MG1 and the motor MG2 is configured as a known synchronous generator/motor which can operate not only as a generator, but also as a motor; and supplies and receives electric power to and from a battery 50 which is a secondary battery through inverters 41 and 42. Power lines 54 connecting the inverters 41 and 42 and the battery 50 are configured as a positive electrode bus line and a negative electrode bus line shared by the individual inverters 41 and 42; and are configured such that the power generated by one of the motors MG1 and MG2 can be consumed by the other motor. Therefore, the battery 50 is charged with electric power generated by one of the motors MG1 and MG2 and is discharged due to electric power shortage. If the electric power consumption and generation is balanced between the motors MG1 and MG2, the battery 50 is assumed to be neither charged nor discharged. Both the motors MG1 and MG2 are drive-controlled by a motor electronic control unit (hereinafter referred to as "motor ECU") 40. The motor ECU 40 receives a signal necessary for drive-controlling the motors MG1 and MG2, for example, a signal from rotational position detection sensors 43 and 44 for detecting a rotational position of a rotor of motors MG1 and MG2; and a phase current which is detected by a current sensor (not shown) and is applied to the motors MG1 and MG2. The motor ECU 40 outputs a switching control signal to inverters 41 and 42 and the like. The motor ECU 40 executes a rotation speed calculation routine (not shown) based on a signal inputted from the rotational position detection sensors 43 and 44, and calculates the rotation speeds Nm1 and Nm2 of rotors of the motors MG1 and MG2. Moreover, the motor ECU 40 communicates with the hybrid ECU 70, drive-controls the motors MG1 and MG2 based on control signals from the hybrid ECU 70, and outputs data about the operating states of the motors MG1 and MG2 to the hybrid ECU 70 as needed.

The battery 50 is managed by a battery electronic control unit (hereinafter referred to as "battery ECU") 52. The battery ECU 52 receives a signal necessary for managing the battery 50, for example, an inter-terminal voltage from a voltage sensor (not shown) provided between the terminals of the battery 50; a charge-discharge current from a current sensor (not shown) provided on the power line 54 connected to an output terminal of the battery 50; a battery temperature Tb from a temperature sensor 51 attached to the battery 50, and the like. The battery ECU 52 outputs data about a state of the battery 50 to the hybrid ECU 70 and the engine ECU 24 through communication as needed. Further, the battery ECU 52 calculates a state of charge (SOC) based on an integrated value of charge and discharge currents detected by the current sensor in order to manage the battery 50.

The brake unit 90 includes a master cylinder 91; a fluid pressure (hydraulic) brake actuator 92; wheel cylinders 93a to 93d that are provided for the wheels 39a and 39b as drive wheels and for other wheels, and that drive brake pads that sandwich brake discs mounted to the respective wheels and that are capable of applying a frictional braking force to a corresponding wheel; wheel cylinder pressure sensors 94a to 94d that are provided for each of the wheel cylinders 93a to 93d and that detect a hydraulic pressure (wheel cylinder pressure) of a corresponding wheel cylinder; and a brake electronic control unit (hereafter, referred to as "brake ECU") 95 that controls the brake actuator 92, and the like. Although not illustrated in the drawings, the brake actuator 92 has a pump and an accumulator as a hydraulic source, a master cylinder cut solenoid valve that controls a communicating state between the master cylinder 91 and the wheel cylinders 93a to 93d, a stroke simulator that creates a reactive force against a pedal depression force corresponding to an amount of depression of a brake pedal 85, and the like. The brake ECU 95 inputs via signal lines (not shown) a master cylinder pressure from a master cylinder pressure sensor (not shown) that detects the master cylinder pressure, wheel cylinder pressures from the wheel cylinder pressure sensors 94a to 94d, wheel speeds from a wheel speed sensor (not shown), and a steering angle from a steering angle sensor (not shown), and the like. The brake ECU 95 also exchanges various signals by communication with the hybrid ECU 70 and the like. The brake ECU 95 controls the brake actuator 92 to ensure that a frictional braking torque acts on the wheels 39a and 39b and other wheels. The frictional braking torque corresponds to the share to be applied by the brake unit 90 out of the total braking torque to be applied to the hybrid vehicle 20 based on a brake pedal stroke BS that indicates the amount of depression of a brake pedal 85 and a vehicle speed V and the like. The brake ECU 95 can also perform so-called ABS control, traction control (TRC), vehicle stability control (VSC) and the like according to diverse parameters detected by sensors (not shown), for example, the wheel speeds, accelerations in a longitudinal direction and in a lateral direction of the vehicle body, a yaw rate, and the steering angle. Furthermore, when predetermined conditions are established, the brake ECU 95 controls the brake actuator 92 so that a frictional braking torque acts on the wheels 39a and 39b and other wheels, independently of an operation to depress the brake pedal 85 by the driver.

The hybrid ECU 70 is configured as a microprocessor around a CPU 72, and in addition to the CPU 72, includes a ROM 74 for storing a processing program; a RAM 76 for temporarily storing data; an input/output port (not shown); and a communication port (not shown). The hybrid ECU 70 receives an ignition signal from an ignition switch (start switch) 80; a shift position SP from a shift position sensor 82 for detecting the shift position SP which is an operation position of a shift lever 81; an accelerator opening Acc from an accelerator pedal position sensor 84 for detecting the amount of depression of an accelerator pedal 83; the brake pedal stroke BS from a brake pedal stroke sensor 86 for detecting the amount of depression of a brake pedal 85; a vehicle speed V from a vehicle speed sensor 87, and the like through the input port. An ECO switch (efficiency priority mode selection switch) 88 for selecting, as a control mode at a time of driving, an ECO mode (efficiency priority mode) that gives priority to energy efficiency such as fuel consumption over drivability is provided in the vicinity of the driver's seat of the hybrid vehicle 20 of the present embodiment. The ECO switch 88 is also connected to the hybrid ECU 70. When the ECO switch 88 is switched on by the driver or the like, a predetermined ECO flag Feco that is set to a value "0" during normal operation (when the ECO switch 88 is "off") is set to a value "1", and the hybrid vehicle 20 is controlled according to various control procedures for use when giving priority to efficiency that are previously defined. As described above, the hybrid ECU is connected via the communication port with the engine ECU 24, the motor ECU 40, the battery ECU 52, the brake ECU 95, and the like, and exchanges various control signals and data with the engine ECU 24, the motor ECU 40, the battery ECU 52, the brake ECU 95, and the like.

The hybrid vehicle 20 of the present embodiment constructed as described above calculates a torque demand to be output to the ring gear shaft 32a functioning as the axle based on the vehicle speed V and an accelerator opening Acc which corresponds to an amount of depression of an accelerator pedal 83 by the driver. The engine 22 and the motors MG1 and MG2 are controlled so as to output a level of power corresponding to the calculated torque demand to the ring gear shaft 32a. The operation control modes for the engine 22 and the motor MG1 and motor MG2 include the following modes: a torque conversion drive mode that operates and controls the engine 22 so that a power amount that matches the torque demand is output from the engine 22, and also drives and controls the motor MG1 and motor MG2 so that all of the power output from the engine 22 is subjected to torque conversion by the power distribution and integration mechanism 30 and the motors MG1 and MG2, and output to the ring gear shaft 32a; a charge and discharge drive mode that operates and controls the engine 22 so that a power amount equivalent to the sum of a power demand and a power required to charge and discharge the battery 50 is output from the engine 22, and also drives and controls the motor MG1 and motor MG2 so that a power demand is output to the ring gear shaft 32a accompanying torque conversion by the power distribution and integration mechanism 30 and the motors MG1 and MG2 of all or a part of the power output from the engine 22 accompanying charging and discharging of the battery 50; and a motor drive mode that operates and controls so as to stop operation of the engine 22 and output a power amount equivalent to the power demand from the motor MG2 to the ring gear shaft 32a.

Figure 2:
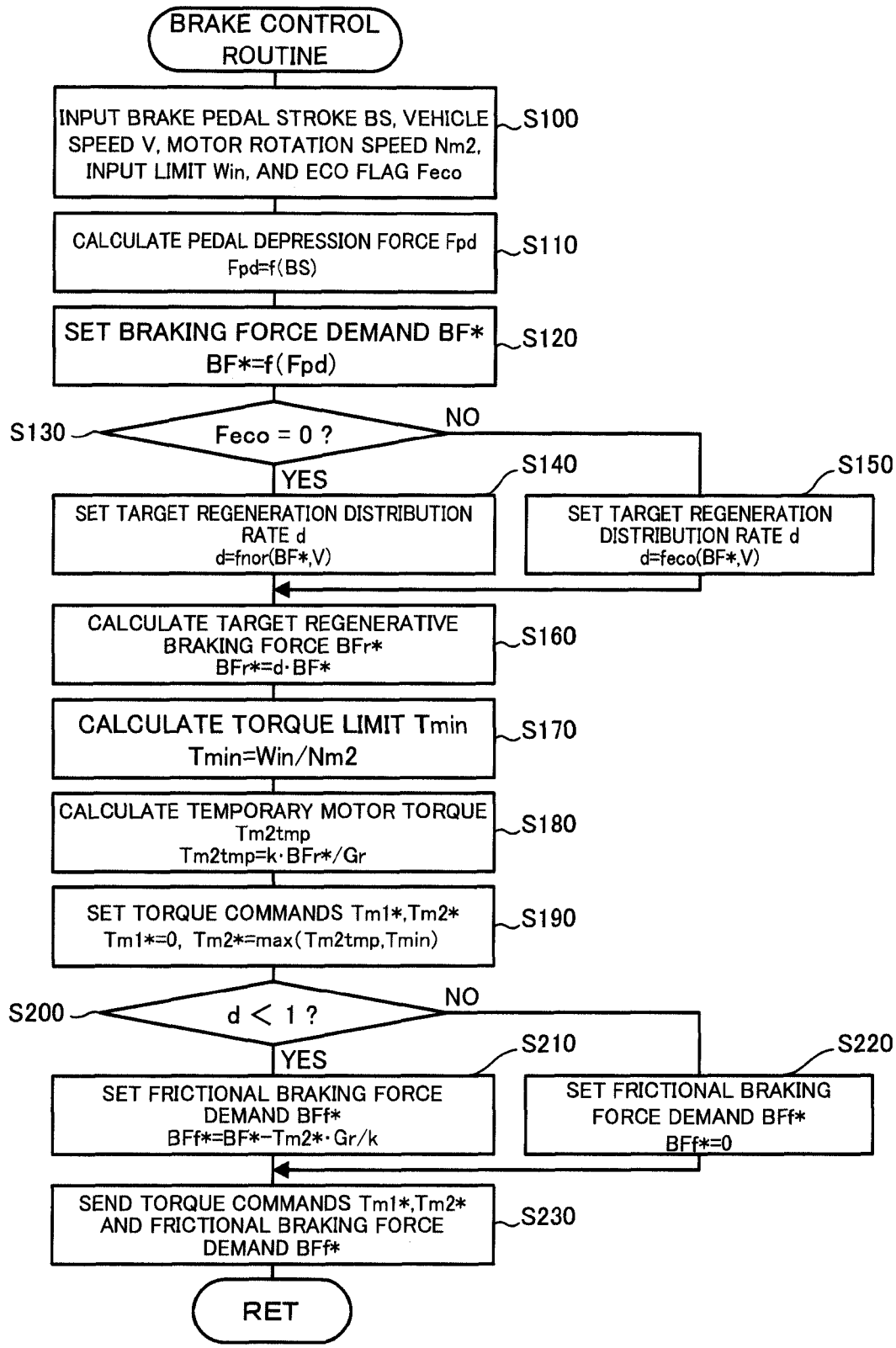
FIG. 2 is a flow chart that illustrates an example of a brake control routine that is executed by the hybrid ECU 70 when the brake pedal 85 is depressed by the driver during driving of the hybrid vehicle 20.

Next, operations when the brake pedal 85 is depressed by the driver during driving of the above described hybrid vehicle 20 are described. FIG. 2 is a flow chart that illustrates an example of a brake control routine that is executed at predetermined time intervals (for example, at intervals of several milliseconds) by the hybrid ECU 70 when the brake pedal 85 is depressed by the driver during driving of the hybrid vehicle 20. In this connection, according to the hybrid vehicle 20 of the present embodiment, because fundamentally the engine is stopped at a time of deceleration of the hybrid vehicle 20, in this case a description is given that takes the operations when stopping the engine 22 as an example.

At the start of the brake control routine shown in FIG. 2, the CPU 72 of the hybrid ECU 70 executes processing to input data required for control, that is, the brake pedal stroke BS from the brake pedal stroke sensor BS, the vehicle speed V from the vehicle speed sensor 87, a rotation speed Nm2 of the motor MG2, an input limit Win as an allowable charging power which is a level of electric power allowable for charging the battery 50, and a value of the ECO flag Feco (step S100). In this case, the rotation speed Nm2 of the motor MG2 is input from the motor ECU 40 by communication. Further, the input limit Win of the battery 50 is input from the battery ECU 52 by communication. It should be noted that the input limit Win of the battery 50 can be set by setting a basic value of the input limit Win based on the temperature of the battery 50, setting an input limit correction coefficient based on the state of charge (SOC) of the battery 50, and multiplying the set basic value by the correction coefficient. After the data input process in step S100, a pedal depression force Fpd that is applied to the brake pedal 85 by the driver is calculated based on the input brake pedal stroke BS (step S110). According to the present embodiment, the relationship between the brake pedal stroke BS and the pedal depression force Fpd is previously defined and stored as an unshown pedal depression force setting map in the ROM 74 of the hybrid ECU 70. As the pedal depression force Fpd, a pedal depression force corresponding to the given brake pedal stroke BS is derived from the relevant map and set. Further, a braking force demand BF* that is demanded by the driver is set based on the thus-calculated pedal depression force Fpd (step S120).

Figure 3:
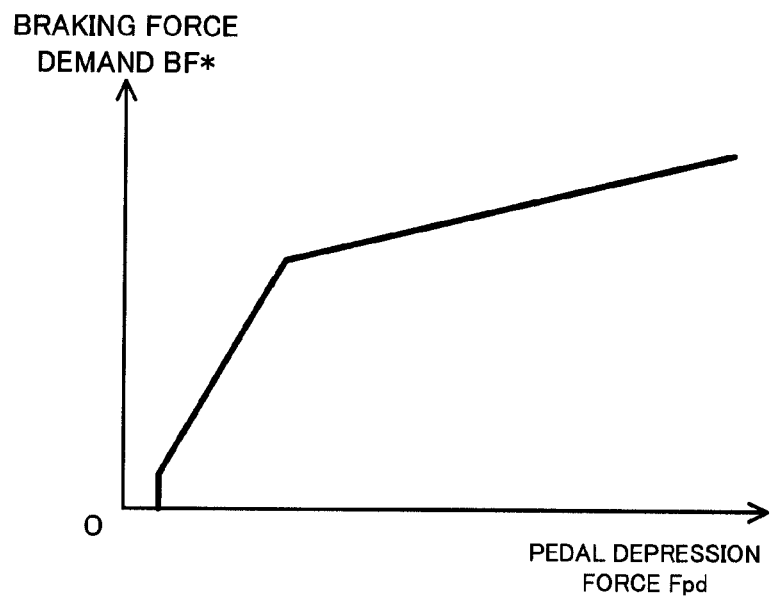
FIG. 3 is an explanatory drawing illustrating an example of a braking force demand setting map.

According to the present embodiment, the relationship between the pedal depression force Fpd applied by the driver and the braking force demand BF* is previously defined and stored as a braking force demand setting map in the ROM of the hybrid ECU 70. As the braking force demand BF*, a braking force demand corresponding to the given pedal depression force Fpd is derived from the relevant map and set. FIG. 3 shows an example of the braking force demand setting map.

Figure 4:
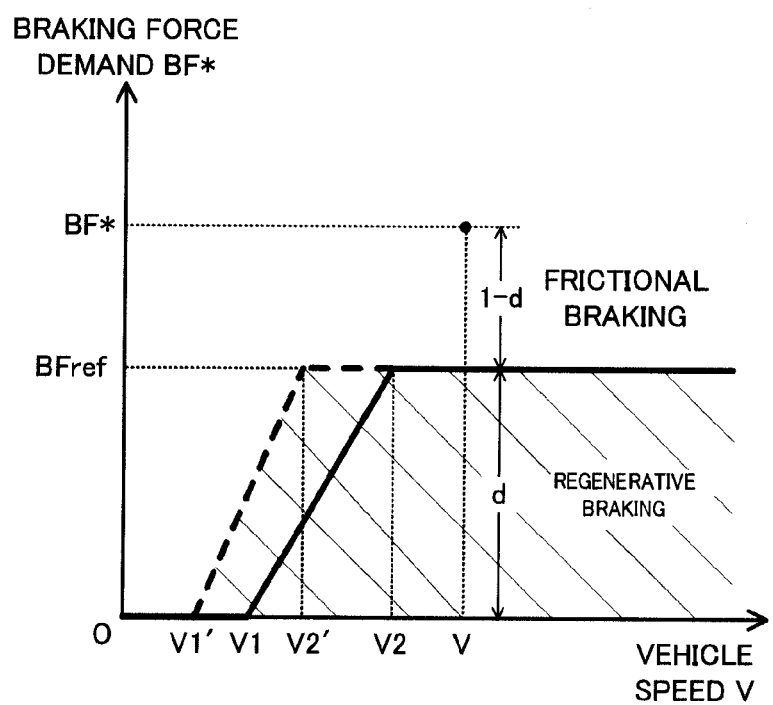
FIG. 4 is an explanatory drawing illustrating an example of a normal regeneration distribution rate setting map and an ECO mode regeneration distribution rate setting map.

Subsequently, the CPU 72 of the hybrid ECU 70 determines whether or not the value of the ECO flag Feco is "0", that is, whether or not the ECO switch 88 has been switched off by the driver or the like (step S130). When the value of the ECO flag Feco is "0", the CPU 72 uses the vehicle speed V input in step S100, the braking force demand BF* set in step S120, and a normal regeneration distribution rate setting map as a first braking force distribution restriction to set a target regeneration distribution rate d that indicates the proportion with respect to the braking force demand BF* of the regenerative braking force to be output from the motor MG2 (step S140). Further, when the ECO switch 88 has been switched on by the driver or the like and the value of the ECO flag Feco is set to "1", the CPU 72 sets the target regeneration distribution rate d using the vehicle speed V input in step S100, the braking force demand BF* set in step S120, and an ECO mode regeneration distribution rate setting map as a second braking force distribution restriction (step S150). As exemplified in FIG. 4, the normal regeneration distribution rate setting map (see the solid line in FIG. 4) and the ECO mode regeneration distribution rate setting map (see the broken line in FIG. 4) each define a relationship between a distribution ratio between a regenerative braking force produced by the motor MG2 and a frictional braking force produced by the brake unit 90 with respect to a certain braking force demand BF* and the vehicle speed V. The normal regeneration distribution rate setting map and the ECO mode regeneration distribution rate setting map are created after previously performing tests and analysis, and are stored in the ROM 74. Accordingly, in step S140 or step S150 the target regeneration distribution rate d corresponding to the given braking force demand BF* and the vehicle speed V is derived from the normal regeneration distribution rate setting map or the ECO mode regeneration distribution rate setting map and set. In this case, according to the present embodiment, when the ECO switch 88 is "off", priority is given to favorably securing drivability such as braking performance and braking feeling over energy efficiency so that if the vehicle speed V exceeds a predetermined lower limit V1 (for example, about 7 km) the motor MG2 is caused to output a regenerative braking force, and when the vehicle speed V is within a range from the lower limit V1 to a predetermined value V2 (for example, about 15 km) the motor MG2 is caused to output a regenerative braking force that is, for example, in proportion to the vehicle speed V, and if the vehicle speed V is greater than the predetermined value V2 the regenerative braking force generated by the motor MG2 is made a constant value BFref irrespective of the vehicle speed V in consideration of the rated torque and the like of the motor MG2. Accordingly, the normal regeneration distribution rate setting map is created so as to satisfy such restrictions for a normal time when priority is given to drivability over energy efficiency (see solid line in FIG. 4). In contrast, when the ECO switch 88 is "on", priority is given to energy efficiency such as fuel consumption over drivability so that if the vehicle speed V exceeds a lower limit V1' (for example, about 4 km) that is lower than the lower limit V1 at a normal time the motor MG2 is caused to output a regenerative braking force, and when the vehicle speed V is within a range from the lower limit V1' to a value V2' (for example, about 10 km) that is lower than the aforementioned predetermined value V2, the motor MG2 is caused to output a regenerative braking force that is, for example, in proportion to the vehicle speed V, and if the vehicle speed V is greater than the value V2' the regenerative braking force generated by the motor MG2 is made a constant value BFref. Accordingly, the ECO mode regeneration distribution rate setting map is created so as to satisfy such restrictions for an ECO mode time when priority is given to energy efficiency over drivability (see the broken line in FIG. 4). More specifically, the ECO mode regeneration distribution rate setting map is defined so that the lower limit V1' of a regeneration execution vehicle speed that is the vehicle speed when causing the motor MG2 to output a regenerative braking force is set lower in comparison to the normal regeneration distribution rate setting map (value V1). As a result, in a case in which the ECO mode regeneration distribution rate setting map is used when the ECO switch 88 is "on", the distribution amount of the regenerative braking force when the vehicle speed V is in a low vehicle speed region (V1'<V≦V2) is greater in comparison to the distribution amount thereof in a case of using the normal regeneration distribution rate setting map when the ECO switch 88 is "off".

When the target regeneration distribution rate d has been set in step S140 or step S150, the CPU 72 calculates a target regenerative braking force BFr* by multiplying the braking force demand BF* set in step S120 by the target regeneration distribution rate d (step S160). Further, the CPU 72 calculates a torque limit Tmin of the motor MG2 by dividing the input limit Win of the battery 50 by the rotation speed Nm2 of the motor MG2 (step S170), and calculates a temporary motor torque Tm2tmp by dividing the product of the target regenerative braking force BFr* and a predetermined conversion factor k by a gear ratio Gr of the reduction gear 35 (step S180). Subsequently, the CPU 72 sets a torque command Tm1* for the motor MG1 to a value "0", and sets the larger value (lower value as a braking torque) among the torque limit Tmin and the temporary motor torque Tm2tmp, which were calculated earlier, as a torque command Tm2* of the motor MG2 (step S190). By setting the torque command Tm2* in this manner, it is possible to cause the motor MG2 to output a regenerative braking torque within the range of the input limit Win of the battery 50. When the torque commands Tm1* and Tm2* of the motors MG1 and MG2 have been set in this manner, the CPU 72 determines whether or not the target regeneration distribution rate d that is set in step S140 or step S150 is less than the value "1" (step S200), and if the target regeneration distribution rate d is less than the value "1" the CPU 72 sets a frictional braking force demand BFf* to be generated by the brake unit 90 by subtracting from the braking force demand BF* a value that is obtained by dividing the product of the torque command Tm2* and the gear ratio Gr of the reduction gear 35 by the aforementioned conversion factor k (step S210). In contrast, when the target regeneration distribution rate d is the value because the braking force demand BF* can be provided by the regenerative braking force generated by the motor MG2, the CPU 72 sets the frictional braking force demand BFf* to the value "0" (step S220). The CPU 72 then sends the torque commands Tm1* and Tm2* to the motor ECU 40 and sends the frictional braking force demand BFf* to the brake ECU 95 (step S230), and thereafter executes the processing from step S100 onward again. The motor ECU 40 receives the torque commands Tm1* and Tm2* and performs switching control of switching elements of the inverters and 42 so that the motors MG1 and MG2 are driven according to the torque commands Tm1* and Tm2*. The brake ECU 95 receives the frictional braking force demand BFf* and controls the brake actuator 92 so as to apply a frictional braking torque that is in accordance with the frictional braking force demand BFf* to the wheels 39*a* and 39*b* serving as drive wheels and other wheels.

As described in the foregoing, according to the hybrid vehicle 20 of the present embodiment, in a case in which the ECO switch 88 is "off" when the driver performs a brake demand operation by depressing the brake pedal 85, the target regeneration distribution rate d is set using the braking force demand BF* based on the brake demand operation and the normal regeneration distribution rate setting map that is the first braking force distribution restriction (step S140), and the motor MG2 and the brake unit 90 are controlled so as to obtain the braking force demand BF* based on the set target regeneration distribution rate d (steps S160 to S230). Further, in a case in which the ECO switch 88 is "on" when the driver performs a brake demand operation by depressing the brake pedal 85, the target regeneration distribution rate d is set using the braking force demand BF* based on the brake demand operation and the ECO mode regeneration distribution rate setting map that is the second braking force distribution restriction which gives priority to energy efficiency in comparison to the normal regeneration distribution rate setting map (step S150), and the motor MG2 and the brake unit 90 are controlled so as to obtain the braking force demand BF* based on the set target regeneration distribution rate d (steps S160 to S230). Thus, according to the hybrid vehicle 20, by only operating the ECO switch 88 as an efficiency priority mode selection switch it is possible to arbitrarily select whether to give priority to drivability or to give priority to improving the energy efficiency of the vehicle. More specifically, by switching the ECO switch 88 "off", since the distribution amount of the frictional braking force applied by the brake unit 90 is adequately secured in a low vehicle speed region, it is possible to favorably secure drivability such as the braking performance and braking feeling even though the energy efficiency is lost to some extent when a brake demand operation is executed. Further, by switching the ECO switch 88 "on", since a distribution amount of the regenerative braking force generated by the motor MG2 in the low vehicle speed region is set to a larger amount, it is possible to improve the energy efficiency even though the drivability is diminished to some degree within a range that does not hinder driving when a brake demand operation is executed. In the hybrid vehicle 20 of the present embodiment, the ECO mode regeneration distribution rate setting map that is used when the ECO switch 88 is "on" is a switch that increases the distribution amount of a regenerative braking force when the vehicle speed V is in a predetermined low vehicle speed region (V1'<V≦V2) in comparison to the normal regeneration distribution rate setting map. Therefore when the ECO switch 88 is switched "on" it is possible to promote energy recovery by the motor MG2 and improve the energy efficiency, i.e. fuel consumption. More specifically, by creating the ECO mode regeneration distribution rate setting map as a setting map that sets the lower limit of the regeneration execution vehicle speed at a lower level in comparison with the normal regeneration distribution rate setting map, the energy efficiency of the vehicle can be improved even more by executing energy recovery by the motor MG2 as much as possible in a low vehicle speed region.

Figure 5:
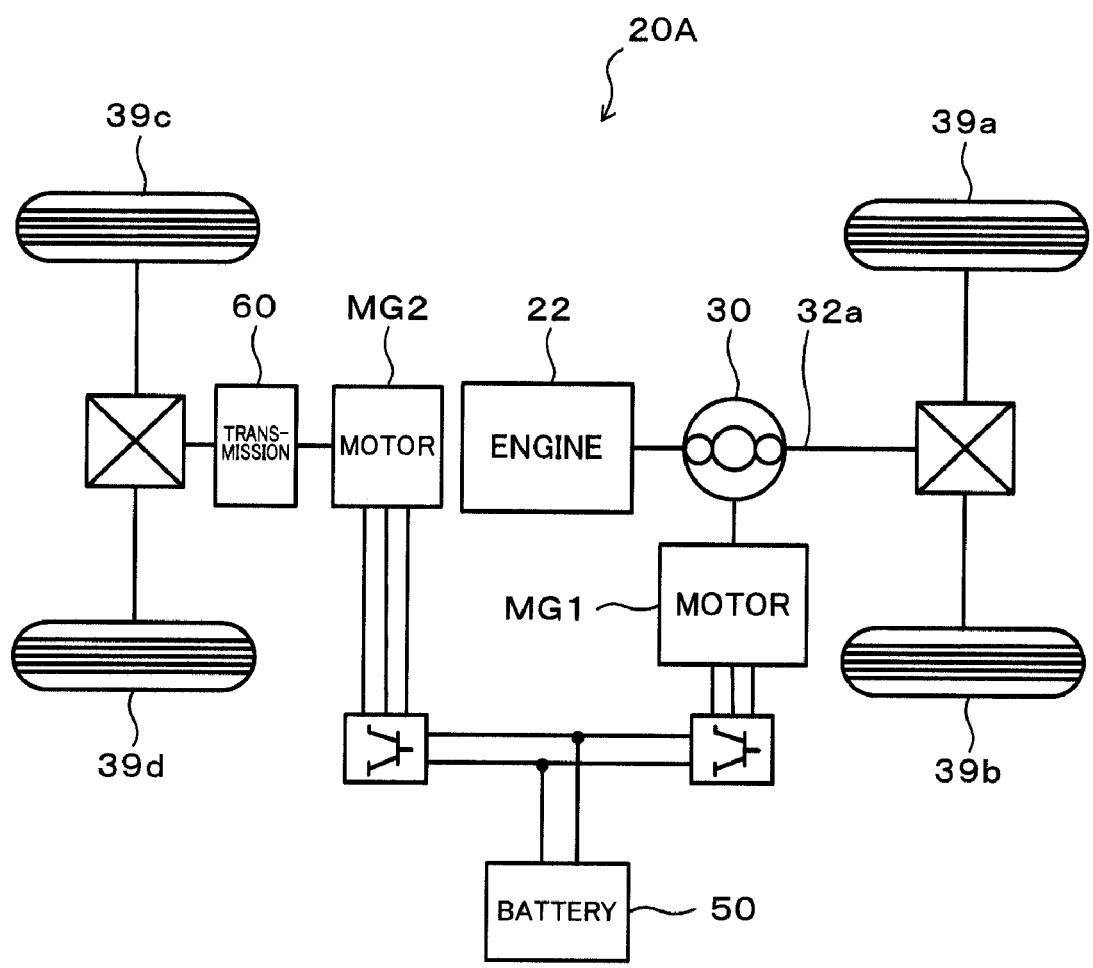
FIG. 5 is a schematic configuration view of a hybrid vehicle 20A which is a variation of the present embodiment.
Figure 6:
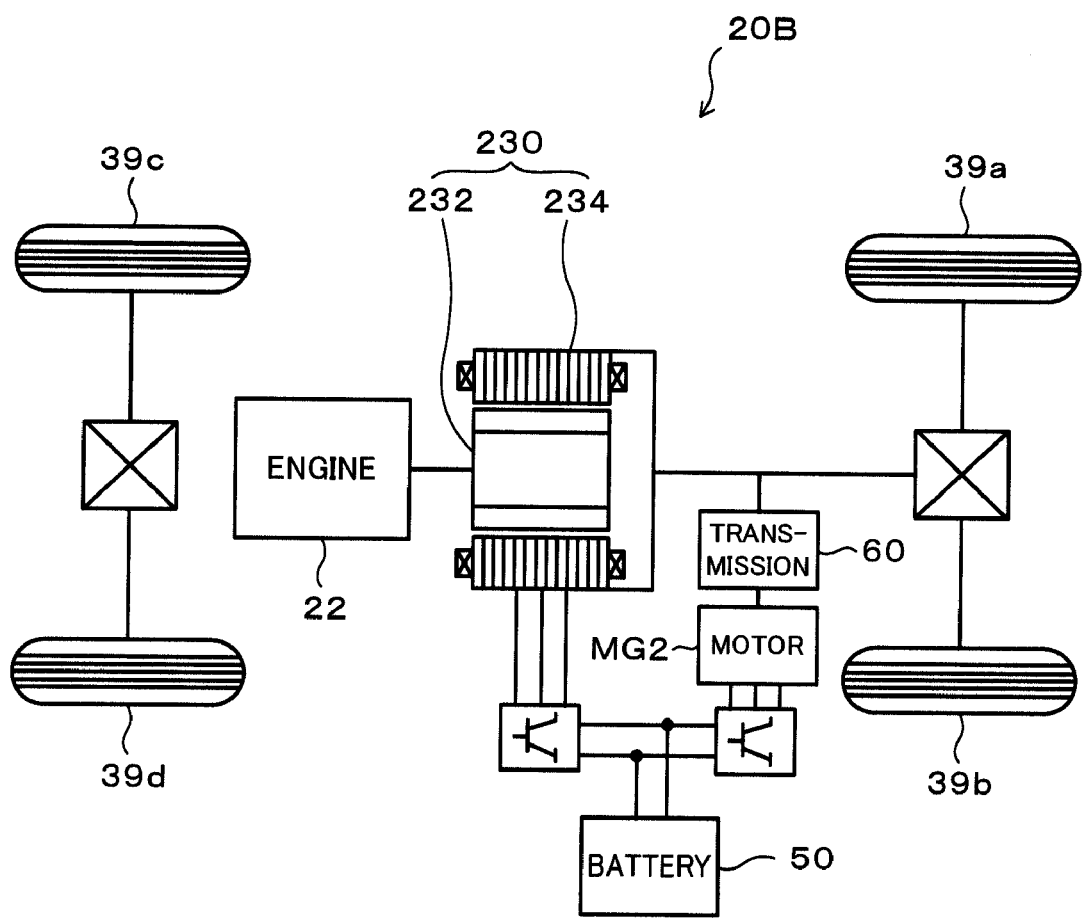
FIG. 6 is a schematic configuration view of a hybrid vehicle 20B which is another variation of the present embodiment.

Although the hybrid vehicle 20 of the above described embodiment is a vehicle that outputs the power of the motor MG2 to an axle connected to the ring gear shaft 32*a*, an object for application of the present invention is not limited thereto. More specifically, as in the case of a hybrid vehicle 20A as a modification example shown in FIG. 5, the present invention may also be applied to a vehicle in which the power of the motor MG2 is output to an axle (axle connected to wheels 39*c* and 39*d* in FIG. 5) that is different from the axle (axle to which the wheels 39*a* and 39*b* are connected) that is connected to the ring gear shaft 32*a*. Further, although the hybrid vehicle 20 of the above described embodiment is a vehicle that outputs the power of the engine 22 to the ring gear shaft 32*a* as an axle connected to the wheels 39*a* and 39*b* via the power distribution and integration mechanism 30, an object for application of the present invention is not limited thereto. More specifically, as in the case of a hybrid vehicle 20B as a modification example shown in FIG. 6, the present invention may also be applied to a vehicle that includes a pair-rotor motor 230 that has an inner rotor 232 connected with the crankshaft of the engine 22, and an outer rotor 234 connected with the axle that outputs the power to the wheels 39*a* and 39*b* and that transmits a part of the power output from the engine 22 to the axle while converting the remainder of the power into electric power. Furthermore, although omitted from the drawings, naturally the present invention can be applied to an electric vehicle that includes a motor capable of inputting and outputting a power to and from an axle as well as a frictional braking unit such as the aforementioned brake unit 90.

Figure 7:
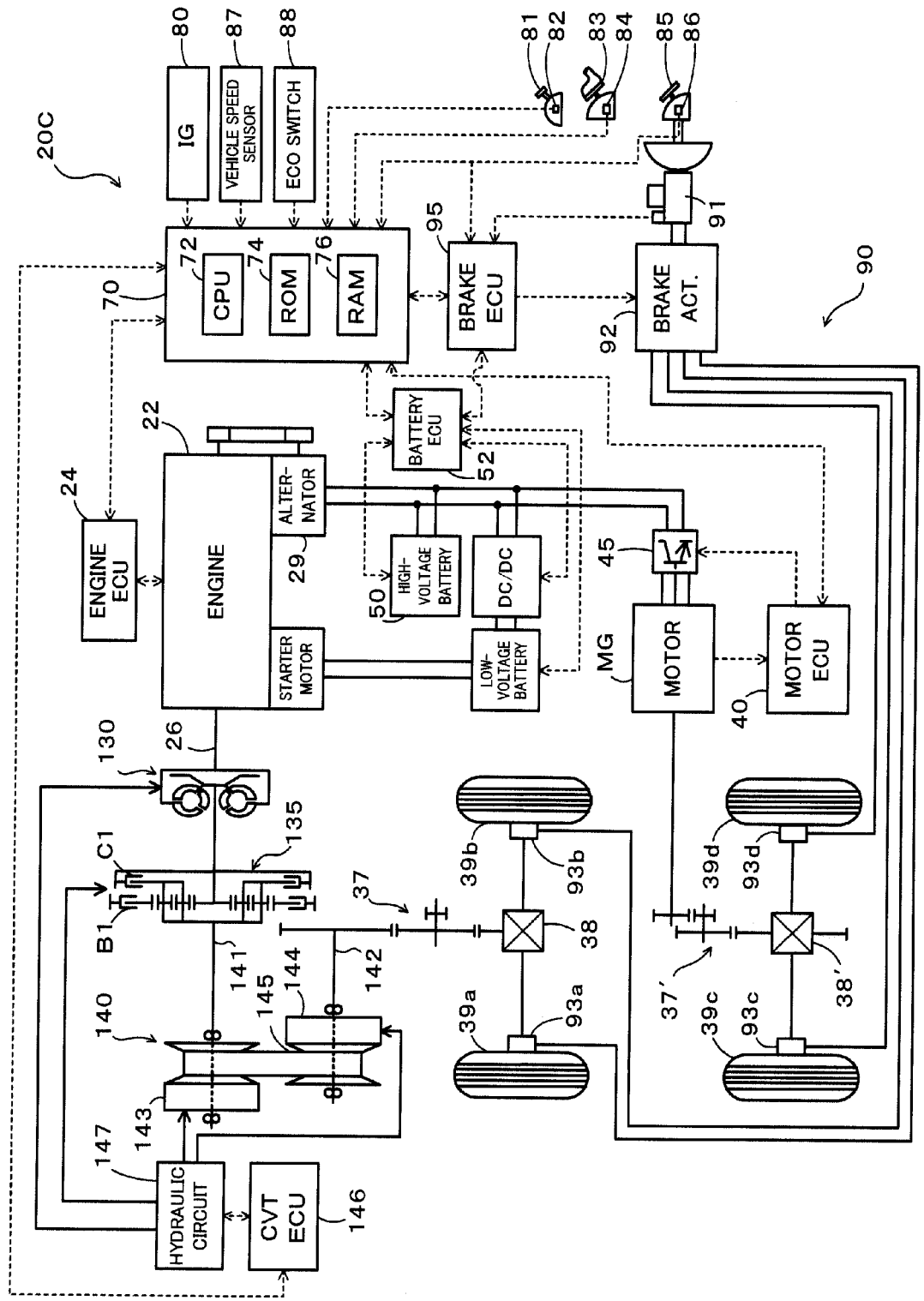
FIG. 7 is a schematic configuration view of a hybrid vehicle 20C which is a still another variation of the present embodiment.

The present invention may also be applied to a vehicle that includes a continuously variable transmission (hereunder, referred to as "CVT") as a power transmitting mechanism that transmits the power from the engine 22 to the axle side instead of the power distribution and integration mechanism 30 that has the ring gear 32 as an axle-side rotational element and the carrier 34 as an engine-side rotational element. A hybrid vehicle 20C that is one example of this kind of vehicle is illustrated in FIG. 7. The hybrid vehicle 20C as a modification example shown in FIG. 7 includes a front-wheel drive system that outputs the power from the engine 22 to, for example, wheels 39*a* and 39*b* that are front wheels via a torque converter 130, a forward/reverse switching mechanism 135, a belt-type CVT 140, a gear mechanism 37, a differential gear 38, and the like; a rear-wheel drive system that outputs a power from a motor MG that is a synchronous motor generator to, for example, wheels 39*c* and 39*d* that are rear wheels via a gear mechanism 37', a differential gear 38', and the like; a brake unit 90 capable of applying a frictional braking force to the wheels 39*a* to 39*d*; and a hybrid ECU 70 that controls the entire vehicle. In this case, the torque converter 130 is configured as a fluid-type torque converter that has a lock-up mechanism. Further, the forward/reverse switching mechanism 135 includes, for example, a double-pinion planetary gear mechanism, a brake B1, and a clutch C1, and executes switching between forward and reverse movement, and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the grooves of the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. The motor MG is connected to an alternator 29 that is driven by the engine 22 via an inverter 45, and is connected to a battery (high-voltage battery) 50 having an output terminal connected to a power line from the alternator 29. Thus, the motor MG is driven by electric power from the alternator 29 or the battery 50, and performs regeneration to charge the battery 50 with electric power that is generated thereby. The hybrid vehicle 20C constructed in this manner drives by outputting mainly a power from the engine 22 to the wheels 39*a* and 39*b* that are front wheels in accordance with an operation of the accelerator pedal 83 by the driver, and, as necessary, drives by four-wheel driving in which, in addition to outputting the power to the wheels 39*a* and 39*b*, a power from the motor MG is output to the wheels 39*c* and 39*d* that are the rear wheels. In this connection, in the hybrid vehicle 20C shown in FIG. 7, a toroidal-type CVT may be applied instead of the belt-type CVT 140.

The correlation between the principal elements of the embodiments and modification examples, and the principal elements of the invention described in the "Disclosure of the Invention" section will now be described. Namely, in the above described embodiment and modification examples, the motors MG2 and MG or the pair-rotor motor 230 that are capable of outputting a regenerative braking force correspond to "motor", and the brake unit 90 that is capable of outputting a frictional braking force corresponds to "frictional braking unit". The ECO switch 88 for selecting the ECO mode that gives priority to energy efficiency such as fuel consumption over drivability corresponds to "efficiency priority mode selection switch", and the hybrid ECU 70 that executes the brake control routine shown in FIG. 2 corresponds to "braking force demand setting module", "braking force distribution ratio setting module", and "brake control module". The engine 22 corresponds to "internal combustion engine". The power distribution and integration mechanism 30 having the ring gear 32 as an axle-side rotational element and the carrier 34 as an engine shaft-side rotational element, and the CVT 140 having the input shaft 141 as an axle-side rotational element and the output shaft 142 as an engine shaft-side rotational element correspond to "power transmitting mechanism". Further, the motor MG1 and the power distribution and integration mechanism 30 or the pair-rotor motor 230 correspond to "electric power-mechanical power input output mechanism", the battery 50 corresponds to "accumulator", the motor MG1 and the alternator 29 or the pair-rotor motor 230 correspond to "motor for power generation", and the power distribution and integration mechanism 30 corresponds to "three shaft-type power input output module". The corresponding relationship between the principal elements of the embodiment and the principal elements of the invention described in the section of Disclosure of the Invention does not restrict the elements of the invention described in the section of Disclosure of the Invention, because the embodiment is one example for specifically explaining the best mode for the embodiment for carrying out the invention described in the section of Disclosure of the Invention. That is to say, the embodiment is merely one specific example of the invention described in the section of Disclosure of the Invention. The invention described in the section of Disclosure of the Invention should be interpreted based on the description in that section.

Hereinbefore, the embodiments of the present invention have been described with reference to drawings, but the present invention is not limited to the above embodiments. It will be apparent that various modifications can be made to the present invention without departing from the spirit and scope of the present invention.

INDUSTRIAL APPLICABILITY

The present invention can be used in a manufacturing industry of a vehicle, and the like.

The invention claimed is:

1. A vehicle having a motor capable of outputting a regenerative braking force and a frictional braking unit capable of outputting a frictional braking force, the vehicle comprising:
a vehicle speed detection unit that detects a vehicle speed;
a braking force demand setting module that sets a braking force demand that is demanded by a brake demand operation of a driver;
an efficiency priority mode selection switch for selecting an efficiency priority mode that gives priority to energy efficiency;
a braking force distribution ratio setting module that sets a distribution ratio between the regenerative braking force and the frictional braking force based on the detected vehicle speed, the set braking force demand and a first braking force distribution restriction that defines a relationship between the vehicle speed and the distribution ratio between the regenerative braking force and the frictional braking force with respect to the braking force demand when the efficiency priority mode selection switch is turned off upon the brake demand operation, the braking force distribution ratio setting module setting the distribution ratio between the regenerative braking force and the frictional braking force based on the detected vehicle speed, the set braking force demand and a second braking force distribution restriction that defines a relationship between the vehicle speed and the distribution ratio with respect to the braking force demand and increases a distribution amount of the regenerative braking force in comparison to the first braking force distribution restriction when the efficiency priority mode selection switch is turned on upon the brake demand operation; and a brake control module that controls the motor and the frictional braking unit so that the braking force demand is ensured based on the set distribution ratio,
wherein the first braking force distribution restriction sets the regenerative braking force to a constant value when the detected vehicle speed is equal to or more than a predetermined value and varies the regenerative braking force in accordance with the vehicle speed when the detected vehicle speed is within a range from the predetermined value to a lower limit of a regeneration execution vehicle speed that is a vehicle speed when the motor is caused to output the regenerative braking force, and wherein the second braking force distribution restriction increases a distribution amount of the regenerative braking force within at least a range from the predetermined value to the lower limit in comparison to the first braking force distribution restriction,
wherein the first braking force distribution restriction sets the regenerative braking force to a constant value when the detected vehicle speed is equal to or more than a predetermined value and varies the regenerative braking force in accordance with the vehicle speed when the detected vehicle speed is within a range from the predetermined value to a lower limit of a regeneration execution vehicle speed that is a vehicle speed when the motor is caused to output the regenerative braking force, and wherein the second braking force distribution restriction sets the regenerative braking force to a constant value when the detected vehicle speed is equal to or more than a second predetermined value smaller than the predetermined value and varies the regenerative braking force in accordance with the vehicle speed when the detected vehicle speed is within a range from the second predetermined value to a second lower limit smaller than the lower limit of the regeneration execution vehicle speed.

2. A vehicle according to claim 1, the vehicle further comprising:
an internal combustion engine;
a power transmitting mechanism that has an axle-side rotational element connected to a predetermined axle and an engine-side rotational element connected to an engine shaft of the internal combustion engine and configured to differentially rotate with respect to the axle-side rotational element, the power transmitting mechanism capable of outputting at least a part of power from the engine shaft to the axle side; and
an accumulator capable of supplying and receiving electric power from the motor,
wherein the motor is capable of inputting and outputting power to the predetermined axle or another axle different from the predetermined axle.

3. A vehicle according to claim 2, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator.

4. A vehicle according to claim 3, wherein the electric power-mechanical power input output mechanism includes a motor for power generation capable of inputting and outputting power, and a three shaft-type power input output assembly connected with three shafts, the predetermined axle, the engine shaft of the internal combustion engine, and a rotating shaft of the motor for power generation, the three shaft-type power input output assembly configured to input and output power to one remaining shaft, based on input and output of powers from and to any two shafts selected among the three shafts, and wherein the motor is capable of outputting power to the predetermined axle or another axle different from the predetermined axle.

5. A vehicle according to claim 2, wherein the power transmitting mechanism is a continuously variable transmission.

6. A vehicle according to claim 1, wherein the motor is capable of inputting and outputting a power to a predetermined axle.

7. A control method of a vehicle including a motor capable of outputting a regenerative braking force, a frictional braking unit capable of outputting a frictional braking force, a vehicle speed detection unit that detects a vehicle speed; a braking force demand setting module that sets a braking force demand that is demanded by a brake demand operation of a driver; and an efficiency priority mode selection switch for selecting an efficiency priority mode that gives priority to energy efficiency, the control method comprising the steps of:

(a) setting a distribution ratio between the regenerative braking force and the frictional braking force based on the detected vehicle speed, the set braking force demand and a first braking force distribution restriction that defines a relationship between the vehicle speed and the distribution ratio between the regenerative braking force and the frictional braking force with respect to the braking force demand when the efficiency priority mode selection switch is turned off upon the brake demand operation, the step (a) setting the distribution ratio between the regenerative braking force and the frictional braking force based on the detected vehicle speed, the set braking force demand and a second braking force distribution restriction that defines a relationship between the vehicle speed and the distribution ratio with respect to the braking force demand and increases a distribution amount of the regenerative braking force in comparison to the first braking force distribution restriction when the efficiency priority mode selection switch is turned on upon the brake demand operation; and (b) controlling the motor and the frictional braking unit so that the braking force demand is ensured based on the distribution ratio set at the step (a), wherein the first braking force distribution restriction sets the regenerative braking force to a constant value when the detected vehicle speed is equal to or more than a predetermined value and varies the regenerative braking force in accordance with the vehicle speed when the detected vehicle speed is within a range from the predetermined value to a lower limit of a regeneration execution vehicle speed that is a vehicle speed when the motor is caused to output the regenerative braking force, and wherein the second braking force distribution restriction increases a distribution amount of the regenerative braking force within at least a range from the predetermined value to the lower limit in comparison to the first braking force distribution restriction, wherein the first braking force distribution restriction sets the regenerative braking force to a constant value when the detected vehicle speed is equal to or more than a predetermined value and varies the regenerative braking force in accordance with the vehicle speed when the detected vehicle speed is within a range from the predetermined value to a lower limit of a regeneration execution vehicle speed that is a vehicle speed when the motor is caused to output the regenerative braking force, and wherein the second braking force distribution restriction sets the regenerative braking force to a constant value when the detected vehicle speed is equal to or more than a second predetermined value smaller than the predetermined value and varies the regenerative braking force in accordance with the vehicle speed when the detected vehicle speed is within a range from the second predetermined value to a second lower limit smaller than the lower limit of the regeneration execution vehicle speed.

* * * * *